UNITED STATES PATENT OFFICE.

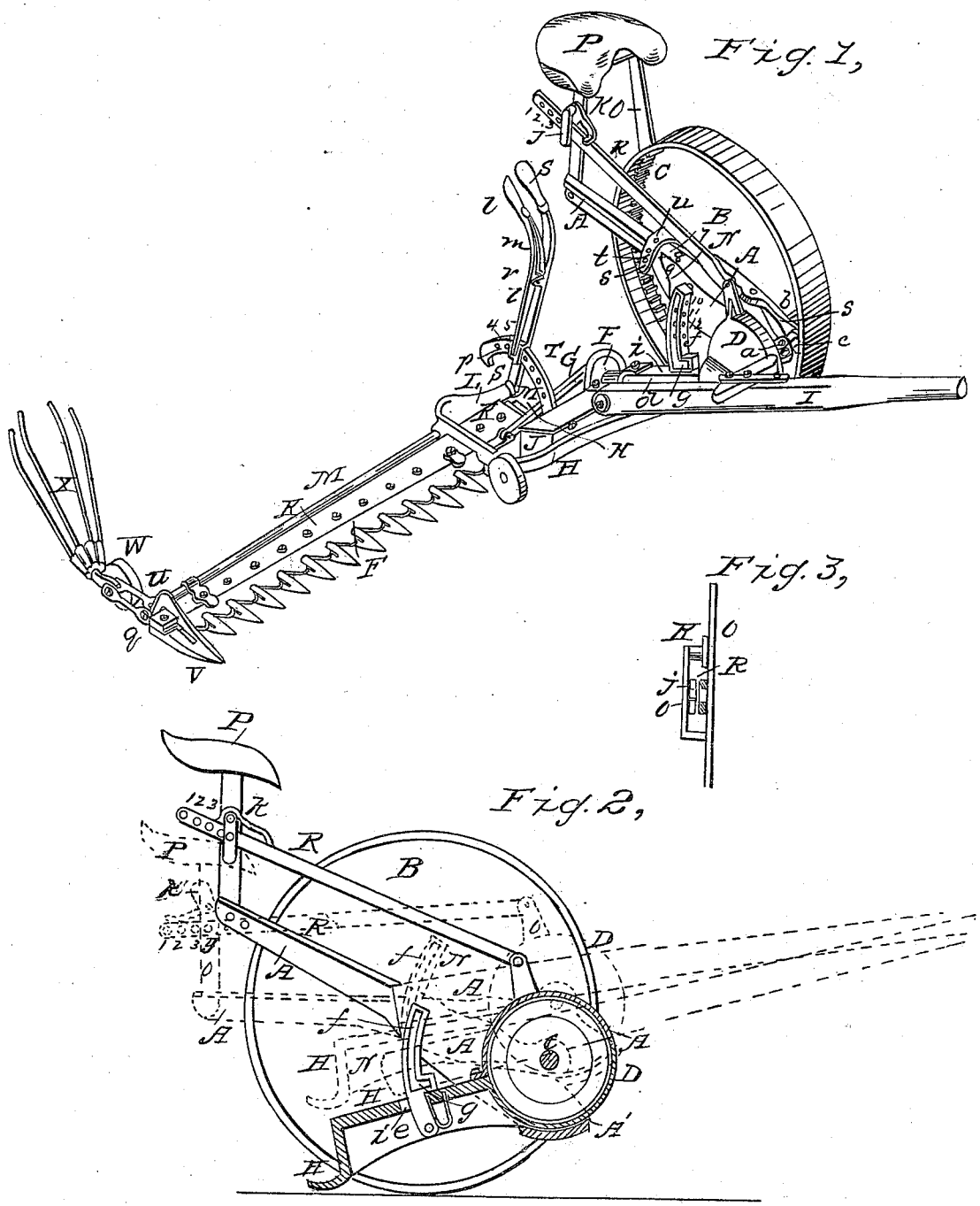

WILLIAM A. KIRBY, OF BUFFALO, NEW YORK, ASSIGNOR TO HIMSELF AND DAVID M. OSBORNE.

IMPROVEMENT IN HARVESTERS.

Specification forming part of Letters Patent No. 42,255, dated April 5, 1864.

*To all whom it may concern:*

Be it known that I, WILLIAM A. KIRBY, of Buffalo, in the county of Erie and State of New York, have invented certain new and useful Improvements in Harvesters; and I do hereby declare that the following is a full, clear, and exact description of the same, reference being had to the accompanying drawings, making a part of this specification, in which—

Figure 1 represents a perspective view of the machine as arranged for mowing grass, &c. Fig. 2 represents a vertical section through the frame, taken from front to rear thereof, and showing by black and red lines the raising and lowering action of the frame and cutting apparatus. Fig. 3 represents detached and on an enlarged scale the mechanism for attaching and detaching the raising and lowering lever.

Similar letters of reference, where they occur in the separate figures, denote like parts of the machine in all of the drawings.

This invention relates to the means of raising up and holding up the main frame and cutting apparatus at any desired height above the ground for cutting the crop higher up or lower down, as also for the facility of transportation, and for letting down said frame and cutting apparatus, so as to rest upon the ground or partially upon the ground and partially upon the supporting-wheels, as may be desired.

To enable others skilled in the art to make and use my invention, I will proceed to describe the same with reference to the drawings.

A represents a segment plate or lever, pivoted to the main frame at $a$, so that it may freely work thereon. To this plate or lever is firmly attached the journal upon which the main driving and supporting wheel B turns. The main wheel B has an internal cogged gear, C, which works into and turns a pinion, $b$, on a shaft, $c$, said shaft being the center around which the plate or lever A turns, so that the pinion $b$ may roll around the cogged gear C, but always remain in mesh with it, unless thrown out by the shipper, as will be hereinafter explained.

Within a closed box, D, which may be so cast or wrought as to form journal boxes or bearings for the shafts $c$ and $d$, which project into or pass through it, are two bevel gears or pinions, one upon the shaft $c$, which gears with and gives motion to the other, which is upon the shaft $d$, said shaft $d$ having upon its rear end the crank-wheel E, which drives the cutters F through the pitman G. The box D entirely protects the bevel-gears upon the two shafts $c$ $d$, and prevents any winding up of grass thereon and consequent clogging. Underneath the box D there is a rounded guard-plate, A', for protecting its lower half, which lower half may be cast with and form a part of the main frame itself.

H is the main frame, cast entire, and having cast in or upon it (in addition to the under half of the box D) suitable flanges to bolt the tongue I to a recess for the shaft $d$ to be let into a tool-box, J, a seat for the finger-bar K, and a bearing, L, for the shaft M, besides minor parts, projections, and recesses, all of which tend to simplify and cheapen the fitting up of the machines, as the points for the material portions of the machine are thus defined, marked out, and placed, and must be uniform. The shield A' may be cast with, as it forms a part of, the plate or lever A, so that when said plate or lever is fitted to its place the shield as a consequence is in its proper place also.

To the main frame, as at $e$, is pivoted an arc, N, having two slots, $f$ $g$, in it, the one, $f$, being circumferential and the other, $g$, radial to the central point or shaft, $c$, around which the plate or lever A moves, and a spring, $h$, bears against this arc N to force it from said central point, $c$, to the extent of the opening $i$ in the main frame, up through which said arc projects.

In the lever or plate A, and at or near the line of the journal of the main drive-wheel B, there is a stud, $n$, which can move freely in either of the slots $f$ $g$ of the arc N, for the purpose of raising and holding up the main frame and its appendages or for letting it down, as the case may be.

To the rear end of the plate or lever A is pivoted one of the seat-supports, O, the other one, O', being similarly pivoted to the end of a lever or brace extending from the end of the journal of the main wheel B rearward for that purpose, and on these supports O O' the driver and operator's seat P is placed.

To a standard, Q, near the front of the main frame, is connected a lever, R, the rear end of which projects through a guide, $j$, on the seat-support O. In this guide $j$ there is a pin, $o$, upon or to which the lever R may be fastened by any one of its holes 1 2 3, &c., and to the guide is also pivoted a lever latch or fastening, $k$, which, (when the lever is caught on the pin,) if dropped down between the lever and the support O, will firmly hold said lever to said pin.

A hand-lever, S, is attached to the end of the shaft M, and projects upward so as to be within reach of the driver or conductor, and to this lever is pivoted at $r$ a lever, $l$, controlled by a spring, $m$, at its upper end and having a bolt at its lower end for taking into any one of the series of holes 4 5 6, &c., in an arc, T, against which the hand-lever S moves, and is guided by a guide-piece, $p$. The outer end of the shaft M, which is bent into a crank form, passes into a block, U, which is hinged at $q$ to the heel of the outside divider or shoe, V, and to the rear of this block U is hung an outside supporting-wheel, W, and also a hinged and turning track-clearer, X.

$s$ is a shipper-lever, connected at its forward end to the pinion $b$, so as to clutch or unclutch said pinion with its shaft $c$. The rear end, $t$, of this shipper-lever comes within reach of the driver, and is bent around to form an arc, and is furnished with holes 7 8 9 for taking over a pin, $u$, in the plate or lever A to hold the pinion clutched or unclutched, as the case may be. The arc N is also furnished with a series of adjusting-holes, 10 11 12, &c., for regulating the extent of the downward motion of the cutting apparatus, while it is free to raise up in yielding to any obstacle in its path.

A small supporting-wheel, Y, may be used to support that part of the main frame next to the cutters and prevent it from dragging upon the ground.

Suppose the main frame and cutting apparatus to be down close to or upon the ground, and it is desired to raise them up for transportation or otherwise. The driver or operator first throws out the lever-catch K and draws the lever R from the pin $o$, and by pressing down upon said lever the plate or lever A at its rear descends, and the main frame at the same time ascends until the stud $n$ comes opposite the radial slot $g$ of the arc N, when the spring $h$ pushes back said arc, the stud $n$ entering the slot $g$, and thus suspending the main frame to the plate or lever A and to the main wheel B, which is hung to the lever or plate B. To correspondingly raise up the outer end of the finger-bar, the hand-lever S and bolting-lever $l$ may be caught and drawn backward, which raises up said outer end upon the wheel W, upon which it will ride. The several parts, when thus raised up, will be in the positions shown in red lines in Fig. 2.

To let down the frame and cutting apparatus, the arc N is pushed forward until the stud $n$ comes opposite to the arc-slot $f$, when they will drop down, and then by reversing the operation of the hand-lever S the outer end of the finger-bar, &c., may be let down.

While I have described the stud $n$ as being upon the plate A and the arc N as upon the main frame, their positions may be reversed and still accomplish the same results.

Having thus fully described the nature of my invention, what I claim therein as new, and desire to secure by Letters Patent, is—

1. In combination with a stud or pin, $n$, upon the plate or lever A, the hinged and slotted arc N upon the main frame, for the purpose of suspending the main frame to the plate or lever at a higher or lower elevation, as may be desired, substantially as described.

2. In combination with the lever A, stud, and arc, the lever R, by which the driver from his seat may raise up, or fasten up, or let down the main frame and cutting apparatus, substantially as described.

WM. A. KIRBY.

Witnesses:
HORACE T. COOK,
I. F. TENILLS.